2,805,920

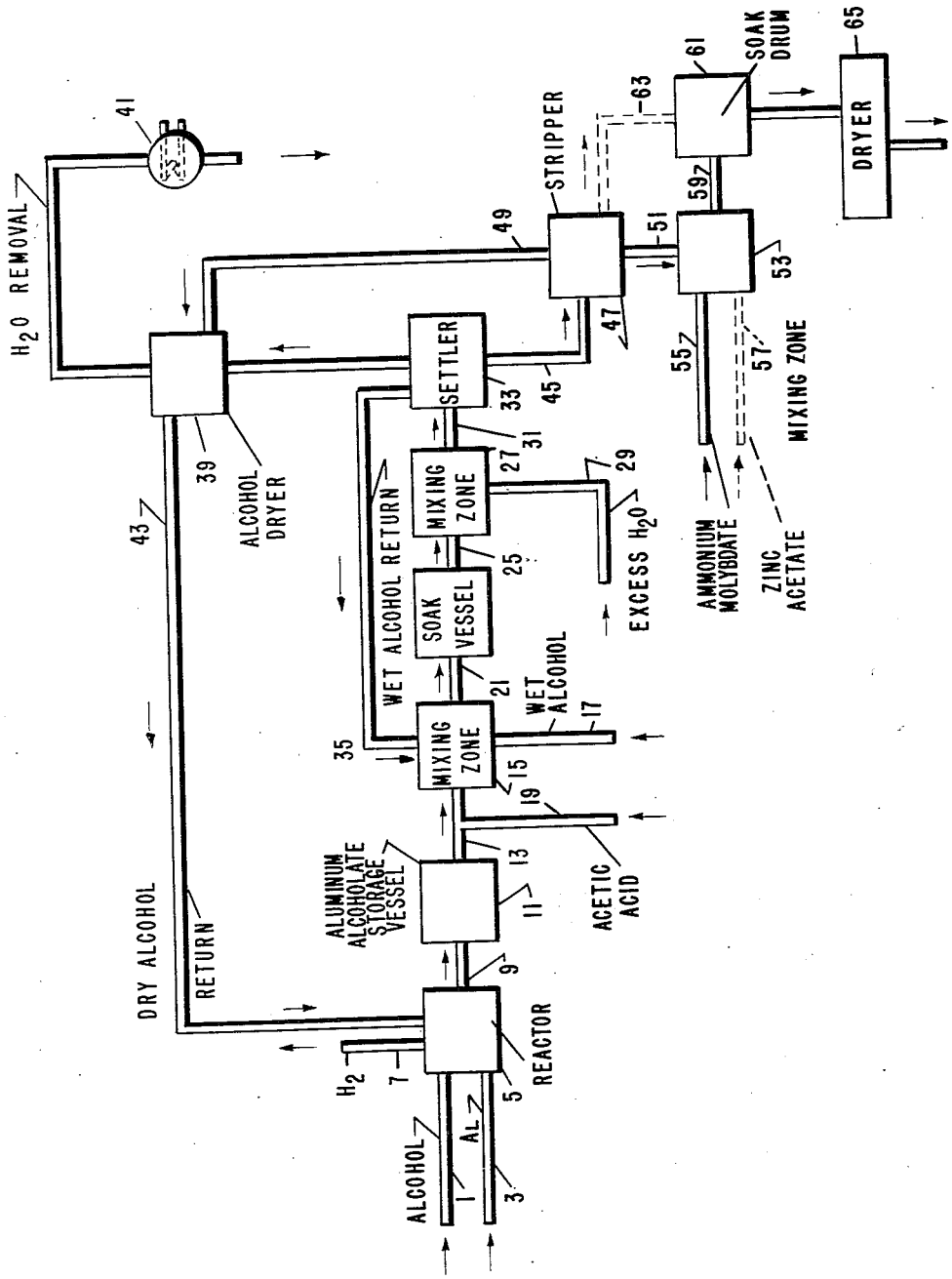

PROCESS FOR HYDROLYZING ALUMINUM ALCOHOLATES IN LIMITED QUANTITIES OF WATER

Roger W. Richardson, Baton Rouge, La., assignor to Esso Research and Engineering Company, a corporation of Delaware Application December 9, 1953, Serial No. 397,111

8 Claims. (Cl. 23—143)

This invention relates to a method for producing an improved alumina and more particularly to the production of a high surface area alumina of good thermal stability which is particularly suited for use as a support or spacing agent for hydroforming or aromatization catalysts.

It is known that petroleum naphthas can be subjected to a reforming treatment to yield liquid products boiling within the gasoline boiling range and possessing improved octane numbers. A well-known and widely used process for upgrading petroleum naphthas is called hydroforming. In hydroforming, the naphtha feed stock is treated at elevated pressures and at temperatures of 750–1050° F. in the presence of a solid catalyst and hydrogen or recycle gas rich in hydrogen. A variety of reactions including dehydrogenation, paraffin and naphthene isomerization, cyclization or aromatization, hydrogenation and hydrocracking occur during hydroforming. All these reactions contribute to the production of a product of increased value not only because of its higher octane number but also because of its improved cleanliness characteristics due to the elimination of gum-forming unsaturated constituents and the removal of sulfur from sulfur-containing constituents.

Catalysts that have been used in hydroforming include various metals such as platinum and palladium and oxides or sulfides of group VI metals particularly molybdenum, chromium, vanadium and tungsten. These catalysts are usually supported upon a base or spacing agent preferably on an adsorptive or high surface area alumina-containing composition such as various activated aluminas, alumina gel and the like.

Alumina is undoubtedly the most widely used support for hydroforming catalysts, not only those containing molybdenum oxide or other group VI metal oxides or sulfides as the active catalyst component but also those containing small amounts of platinum or palladium as the active component. Various methods have been proposed and utilized for the preparation of alumina catalyst supports such as reaction of an aluminum salt to give aluminum hydroxide, by the hydrolysis of an aluminum alcoholate or by heating or calcining alpha alumina trihydrate or beta alumina trihydrate.

It is well known in several catalytic hydrocarbon conversions that catalysts having the same chemical composition but prepared in different ways may differ widely in their ability to promote certain reactions or hydrocarbon conversions. Accordingly, the development of catalysts for hydroforming has been empirical in nature and many methods have been suggested and many substances proposed as activators or stabilizers for hydroforming catalysts. Previous experience with hydroforming catalysts has shown that the catalyst base or support exerts a strong influence upon the ultimate behavior or activity of the catalyst. In view of the ever-increasing demands for larger quantities of higher octane number motor gasolines a great deal of research effort has been expended in order to develop hydroforming catalysts which are capable of giving high yields of high octane gasolines, i. e. which possess high activity and high selectivity characteristics.

It is the object of this invention to prepare improved hydroforming catalysts.

It is also an object of this invention to prepare improved supports or carriers for various active catalytic components.

It is a further object of this invention to prepare an alumina base for hydroforming catalysts of high thermal stability from aluminum alcoholate.

These and other objects will appear more clearly from the detailed specification and claims which follow.

It has now been found that alumina bases characterized by high thermal stability may be prepared by hydrolyzing aluminum alcoholate by means of limited amounts of water dissolved in an organic liquid such as an alcohol. In a preferred embodiment the aluminum alcoholate is hydrolyzed by means of a water saturated $C_4$–$C_6$ alcohol. The alcohols used in the manufacture of the aluminum alcoholate may range from one to about ten or twelve carbon atoms per molecule. In general, best results are obtained by using alcohols in the $C_4$–$C_6$ range since these are more readily recoverable in anhydrous form for re-use in the manufacture of aluminum alcoholate. By using restricted amounts of water, particularly a water saturated higher alcohol to effect hydrolysis of the alcoholate, it is possible to insure the complete or substantially complete conversion of the aluminum alcoholate to alumina alpha monohydrate (boehmite) which, in turn, is readily converted to eta alumina by heating or calcining at temperatures from about 900–1400° F. for short periods. Eta alumina derived from alumina alpha monohydrate prepared by hydrolyzing aluminum alcoholate in wet alcohol has a substantially greater heat stability than alumina derived from hydrous alumina prepared by more conventional means, as will be shown later in several specific examples. Moreover, by agitating the aluminum alcoholate solution in the alcohol containing the restricted amounts of water for hydrolysis it is possible to subdivide the alcoholate into small droplets so that during hydrolysis and subsequent gelling the alumina is obtained in the form of spheroids or microspheres.

Reference is made to the accompanying drawing which illustrates a diagrammatic flow plan of one embodiment of the present invention:

Referring to the drawing, alcohol and aluminum metal are fed through lines 1 and 3 respectively to reactor 5 where they react to form aluminum alcoholate and hydrogen. If desired a hydrocarbon diluent can be provided in order to facilitate temperature control. The hydrogen gas is vented through line 7. The alcohol used can have from one to about twelve carbon atoms per molecule, but it is preferred to use Pentasol, a commercial mixture of amyl alcohols. The aluminum alcoholate formed in reactor 5 is passed via line 9 to a storage vessel 11 if desired. The aluminum alcoholate from storage drum 11 is fed via line 13 to mixing zone 15 where it is contacted with amyl alcohol saturated with water, fed to mixing zone 15 via line 17. If desired, a peptizing agent such as acetic acid, may be added to the aluminum alcoholate stream via line 19. Hydrolysis zone 15 is preferably a zone of efficient agitation and mixing; in this zone the aluminum alcoholate is converted to alpha alumina monohydrate. The flow rates of aluminum alcoholate (line 13) and wet alcohol (containing about 9 wt. percent $H_2O$) from line 17 are adjusted so that a slight excess, preferably no more than about 10% of the stoichiometric amount of water is present according to the reaction $2Al(OR)_3 + 4HOH \rightarrow Al_2O_3.H_2O + 6ROH$.

The mixture from zone 15 is passed by line 21 to soaking drum 23, if desired, to make certain that hydrolysis is complete. The mixture from soaking vessel 23 is passed by line 25 to mixing zone 27 where it is contacted with an excess amount of water from line 29 and forms two liquid phases. Zone 27 is a zone of efficient agitation and mixing. The mixture from zone 27 is passed by line 31 to settler 33. In zone 33 the alumina is allowed to settle out in the aqueous phase. The water-saturated alcohol phase which rises to the top is divided into two streams; one stream is returned to mixing zone 15 by line 35 and reused. The other stream of wet alcohol from settler 33 is passed by line 37 to a drying tower 39 where the water is removed by azeotropic distillation and condensed in condenser 41. The dry alcohol is returned to reactor zone 5 from drying zone 39 by line 43. The aqueous phase in settler 33 is passed by line 45 to a stripping zone 47 where the remaining amounts of alcohol are removed and sent to distillation tower 39 via line 49. The aqueous slurry or sol in stripping zone 47 is passed by line 51 to impregnation zone 53 where ammonium molybdate or other dehydrogenating agent is added by line 55. If desired, zinc acetate solution is added to mixing zone 53 by line 57 to form a zinc-alumina type base before addition of the dehydrogenating component. The mixture in zone 53 is passed by line 59 to a soaking drum 61 for aging. If desired, a portion of the material in vessel 61 may be returned to vessel 47 by line 63 where it may serve as seed for future growth of the same type structure in vessels 47 and 53. The impregnated mixture in vessel 61 is dried in zone 65 which may comprise a spray dryer. If desired a drying zone may be interjected between vessels 47 and 53 to effect a drying of the base.

Instead of impregnating the alumina sol with a catalytic component, the alumina may be converted to the gel form and dried or lightly calcined before impregnation. Catalytic components that may be applied to the alumina produced in accordance with the present invention include molybdic oxide, chromic oxide, vanadium oxide, nickel oxide, platinum, palladium or mixtures of these and other hydrogenating and hydroforming components. The catalytic components can be composited with the alumina in any well known manner. For example, molybdic oxide can be applied as ammonia molybdate solution or molybdic oxide may be dry-mixed with the alumina and calcined while platinum may be applied as a heat decomposable compound or the platinum may be deposited by precipitation in known manner. The amount of catalytic component added varies somewhat depending upon the particular one used. For example, in the case of molybdenum oxide, the amount may vary from about 5 to 20 wt. percent of the total catalyst with about 10 wt. percent preferred while in the case of chromium oxide, a higher percentage is generally required, for example, about 10 to 50 wt. percent of the total catalyst. Platinum is ordinarily used in amounts of from about 0.01 to about 2.0 wt. percent with about 0.5 wt. percent preferred while palladium is used in amounts of from about 0.2 to 5.0 wt. percent of the total catalyst. Ordinarily, it is preferred to activate the catalyst compositions by calcining at temperatures of about 1000–1400° F. before use in a hydroforming operation.

The following example is illustrative of the present invention.

*Example*

Aluminum alcoholate was prepared in a continuous reactor wherein a 75% anhydrous Pentasol (a commercial mixture of isomeric amyl alcohols) and 25% hydrocarbon having a 240–280° F. boiling range was contacted with aluminum metal using $HgCl_2$ as a catalyst. The mixture was heated to about 250° F. to initiate the reaction whereupon cooling was applied in order to limit the temperature rise. The alcoholate produced contained a quantity of aluminum equivalent to 50 grams $Al_2O_3$ per liter.

Aluminum alcoholate prepared as described was slowly added and with agitation to commercial isopropyl alcohol (91% $iC_3H_7OH$–9% $H_2O$) at room temperature. The hydrolzed product was divided into three parts which were treated as follows:

Sample A was treated with an additional amount of water, equivalent in volume to the alcohol-alumina mixture. The supernatant liquid was decanted and the alumina dried in an oven at 260° F.

Sample B was treated with an additional amount of water, equivalent in volume to the alcohol-alumina mixture. The total volume of mixture was then heated on a steam bath for 24 hours, then dried in an oven at 260° F.

Sample C comprised the hydrolyzed alumina in the isopropyl alcohol, and was dried directly in a vacuum oven at 160° F. and 25 inches vacuum with no additional water added.

Sample D was prepared by hydrolyzing one volume of aluminum alcoholate in two volumes of water at room temperature, using rapid and efficient agitation. The alcohol-hydrocarbon layer was decanted off and rejected. The aqueous alumina slurry was dried in an oven at 260° F.

An X-ray examination of the above described aluminas after drying at 260° F. shows:

Sample A, all boehmite
Sample B, about equal amounts of boehmite and bayerite
Sample C, all boehmite
Sample D, all bayerite These data show conclusively that the monohydrate (boehmite) is formed when the hydrolysis is effected in wet alcohol as described and that the conversion of the monohydrate to the trihydrate (bayerite), even in the presence of a large excess of water, is difficult to achieve as witnessed with Sample B. In addition, a sample prepared by hydrolyzing aluminum alcoholate in water-saturated "Pentasol," a mixture of amyl alcohols, when treated further according to Sample A above also gave a pure boehmite X-ray pattern.

Samples A, B, C, and D when heated at 1200° F. for 6 hours are converted to the eta alumina crystalline form. Heat stability data for these samples as pertains to surface area retention after heating at high temperatures are shown below. The surface areas were obtained using nitrogen adsorption according to the method of Brunauer, Emmett and Teller.

| | Surface Area, M.²/g. | | | | Pore Volume, cc./g. | | | |
|---|---|---|---|---|---|---|---|---|
| | A | B | C | D | A | B | C | D |
| Heat Treatment: | | | | | | | | |
| 3 Hrs. @ 1,400° F | 190 | 153 | 238 | 46 | 0.51 | 0.50 | 1.39 | 0.27 |
| 3 Hrs. @ 1,550° F | 156 | 119 | 274 | 19 | 0.47 | 0.51 | 1.43 | 0.18 |

These data show that those samples (A and C) which were derived from boehmite show higher surface areas than those which were prepared from a mixture of boehmite and bayerite (Sample B). Also, the surface area retention is greater for those aluminas derived from boehmite. In addition it appears that greater stability may result when the hydrolyzate is not exposed to additional large amounts of water as evidenced by the results with Sample C.

The sample which was hydrolyzed in the conventional manner (Sample D) and which after drying showed a crystalline pattern of 100 percent bayerite, was much poorer than any of the other aluminas in stability towards heat.

This application is a continuation-in-part of application Serial No. 294,164, filed June 18, 1952, now Patent No. 2,746,934 by Roger W. Richardson and Robert E. Schexnailder, Jr.

The foregoing specification contains a limited number of embodiments of the present invention. It will be understood that this invention is not limited hereto since numerous variations are possible without departing from the scope of this invention.

What is claimed is:

1. A process of preparing alumina which comprises hydrolyzing a solution of an aluminum alcoholate of an alcohol containing from 1 to 10 carbon atoms per molecule by contacting said solution with at most about 110% of the stoichiometric amount of water necessary to convert the aluminum alcoholate to alpha alumina monohydrate dissolved in an aliphatic alcohol containing at most six carbon atoms per molecule thereby forming alpha alumina monohydrate.

2. A process of preparing alumina which comprises hydrolyzing a solution of an aluminum alcoholate of an alcohol containing from 1 to 10 carbon atoms per molecule by contacting said solution with a water-saturated aliphatic alcohol containing 4 to 6 carbon atoms per molecule, thereby forming alpha alumina monohydrate.

3. A process of preparing alumina which comprises hydrolyzing a solution of an aluminum alcoholate of an alcohol containing from 1 to 10 carbon atoms per molecule by contacting said solution with at most about 110% of the stoichiometric amount of water necessary to convert the aluminum alcoholate to alpha alumina monohydrate, dissolved in an aliphatic alcohol containing at most six carbon atoms per molecule, drying and calcining the alumina at a temperature below 1400° F.

4. A process of preparing alumina which comprises hydrolyzing a solution of an aluminum alcoholate of an alcohol containing from 1 to 10 carbon atoms per molecule by contacting said solution with a water-saturated aliphatic alcohol containing from 4 to 6 carbon atoms per molecule to form alpha alumina monohydrate, drying and calcining the alumina at a temperature below 1400° F.

5. A process of preparing alumina which comprises hydrolyzing a solution of an aluminum alcoholate of an alcohol containing from 4 to 6 carbon atoms per molecule by contacting said solution with at most about 110% of the stoichiometric amount of water necessary to convert the aluminum alcoholate to alpha alumina monhydrate, dissolved in an aliphatic alcohol containing at most six carbon atoms per molecule, drying and calcining the alumina at a temperature below 1400° F.

6. A process of preparing alumina which comprises hydrolyzing a solution of an aluminum alcoholate of an alcohol containing from 4 to 6 carbon atoms per molecule by contacting said solution with a water-saturated aliphatic alcohol containing from 4 to 6 carbon atoms per molecule to form alpha alumina monohydrate, drying and calcining the alumina at a temperature below 1400° F.

7. A process of preparing alumina which comprises hydrolyzing a solution of an aluminum amylate by contacting said solution with at most about 110% of the stoichiometric amount of water necessary to convert the aluminum alcoholate to alpha alumina monohydrate dissolved in an aliphatic alcohol containing at most six carbon atoms per molecule, drying and calcining the alumina at a temperature below 1400° F.

8. A process of preparing alumina which comprises hydrolyzing a solution of an aluminum amylate by contacting said solution with a water-saturated aliphatic alcohol containing from 4 to 6 carbon atoms per molecule to form alpha alumina monohydrate, drying and calcining the alumina at a temperature below 1400° F.

References Cited in the file of this patent

UNITED STATES PATENTS

| | | |
|---|---|---|
| 2,579,251 | Coates et al. | Dec. 18, 1951 |
| 2,636,865 | Kimberlin | Apr. 28, 1953 |

FOREIGN PATENTS

| | | |
|---|---|---|
| 667,145 | Great Britain | Feb. 27, 1952 |

OTHER REFERENCES

Hackh's Chemical Dictionary, published by the Blakiston Co., Phila., third ed., 1944, page 40.

Industrial and Engineering Chemistry, "Thermal Transformation of Aluminas and Alumina Hydrates," H. C. Stumpf et al., vol. 42, July 1950, pages 1398–1403.